(12) United States Patent
Smith et al.

(10) Patent No.: US 11,203,088 B2
(45) Date of Patent: Dec. 21, 2021

(54) APPARATUS AND METHOD FOR DISCRETELY POSITIONING A WELDING TORCH

(71) Applicant: CRC-EVANS PIPELINE INTERNATIONAL, INC., Houston, TX (US)

(72) Inventors: Travis W. Smith, The Woodlands, TX (US); Jose C. Bouche, Tomball, TX (US)

(73) Assignee: CRC-Evans Pipeline International, Inc., Houston, TX (US)

(*) Notice: Subject to any disclaimer, the term of this patent is extended or adjusted under 35 U.S.C. 154(b) by 94 days.

(21) Appl. No.: 16/848,184

(22) Filed: Apr. 14, 2020

(65) Prior Publication Data
US 2021/0316408 A1  Oct. 14, 2021

(51) Int. Cl.
*B23K 37/00*  (2006.01)
*B23K 37/02*  (2006.01)

(52) U.S. Cl.
CPC ...... *B23K 37/0211* (2013.01); *B23K 37/0258* (2013.01); *B23K 37/0276* (2013.01)

(58) Field of Classification Search
CPC .......................................... B23K 37/053–0538
USPC .................................. 228/44.5, 49.3, 25, 32
See application file for complete search history.

(56) References Cited

U.S. PATENT DOCUMENTS

| | | | | |
|---|---|---|---|---|
| 2,726,620 A | * | 12/1955 | Meissner | B23K 37/02 228/27 |
| 3,128,368 A | * | 4/1964 | Franz | B23K 9/0209 219/125.12 |
| 3,132,617 A | * | 5/1964 | Miller | B23K 9/02 228/7 |
| 3,220,629 A | * | 11/1965 | Anderson | B23K 9/0206 228/25 |
| 3,777,103 A | * | 12/1973 | White | B23K 37/0276 219/60 A |
| 3,922,517 A | | 11/1975 | Nelson et al. | |
| 3,975,003 A | * | 8/1976 | Buford | B23K 7/006 266/56 |
| 4,205,774 A | * | 6/1980 | Madden | B23K 37/0276 219/125.1 |
| 4,248,372 A | * | 2/1981 | Nomura | B23K 9/028 228/32 |
| 4,371,107 A | * | 2/1983 | Watanabe | B23K 37/02 219/124.31 |

(Continued)

FOREIGN PATENT DOCUMENTS

| | | | |
|---|---|---|---|
| CA | 2869958 A1 | * 10/2013 | ......... B23K 37/0282 |
| JP | 49150986 U | 12/1974 | |

(Continued)

OTHER PUBLICATIONS

International Search Report dated Aug. 9, 2021 cited in corresponding PCT Application No. PCT/EP2021/059572.

*Primary Examiner* — Kiley S Stoner
(74) *Attorney, Agent, or Firm* — Kofi A. Schulterbrandt

(57) ABSTRACT

Provided is an apparatus for coating a girth weld and a cutback region surrounding said girth weld, said apparatus having lateral travel at least equal to the length of the cutback region and circumferential rotational travel around the pipe. The apparatus can provide a multiple component coating accurately and safely, without the need for solvent flushing of the apparatus.

15 Claims, 14 Drawing Sheets

(56) References Cited

U.S. PATENT DOCUMENTS

| | | | | |
|---|---|---|---|---|
| 4,392,604 | A * | 7/1983 | Sears | B23K 37/04 228/212 |
| 4,542,276 | A * | 9/1985 | van den Berg | B23K 37/0533 219/60 A |
| 4,667,936 | A * | 5/1987 | Hale, Jr. | B23D 21/02 266/55 |
| 4,798,928 | A * | 1/1989 | VanRhyn | B23K 9/0288 219/125.11 |
| 5,227,601 | A | 7/1993 | Black | |
| 5,332,143 | A * | 7/1994 | Furukawa | B23K 9/287 228/8 |
| 5,443,199 | A * | 8/1995 | Krumszyn | B23K 9/0286 228/29 |
| 5,685,996 | A * | 11/1997 | Ricci | B23B 5/163 219/121.39 |
| 10,369,668 | B2 * | 8/2019 | Jack | B23K 9/0026 |
| 2003/0047585 | A1 * | 3/2003 | McCombe | B23K 9/291 228/49.1 |
| 2004/0035171 | A1 * | 2/2004 | Gormany | B23K 37/0282 72/125 |
| 2006/0163317 | A1 * | 7/2006 | Wirth | B23Q 1/527 228/32 |
| 2007/0023479 | A1 * | 2/2007 | Koppert | B23K 9/0286 228/101 |
| 2010/0301103 | A1 * | 12/2010 | Bonelli | B23K 9/0216 228/227 |
| 2013/0264752 | A1 * | 10/2013 | Magnuson | B23K 7/10 266/77 |
| 2013/0306710 | A1 * | 11/2013 | Kim | B23K 37/0282 228/45 |
| 2014/0034714 | A1 * | 2/2014 | Gatlin | B23K 9/121 228/212 |
| 2014/0091129 | A1 * | 4/2014 | Peters | B23K 37/0294 228/102 |
| 2014/0103016 | A1 * | 4/2014 | Ward | B23K 37/047 219/121.39 |
| 2015/0129580 | A1 * | 5/2015 | Miller | B23K 37/0211 219/60 A |
| 2015/0174661 | A1 * | 6/2015 | Brandstrom | B23K 37/0288 228/9 |
| 2015/0258640 | A1 * | 9/2015 | Aubin | B23K 9/173 228/9 |
| 2015/0273605 | A1 * | 10/2015 | Choi | B23K 37/0276 148/201 |
| 2016/0008907 | A1 * | 1/2016 | Miller | B23K 37/0276 219/60 A |
| 2017/0056998 | A1 * | 3/2017 | Mori | B23K 9/0286 |
| 2017/0276260 | A1 * | 9/2017 | Bonel | F16L 1/19 |
| 2018/0001422 | A1 * | 1/2018 | Rajagopalan | B23K 9/0286 |
| 2018/0117718 | A1 * | 5/2018 | Rajagopalan | B23K 37/0531 |
| 2019/0184485 | A1 * | 6/2019 | Dong | B23K 37/0276 |

FOREIGN PATENT DOCUMENTS

| | | |
|---|---|---|
| JP | 2009255137 A | 11/2009 |
| KR | 20150138655 A | 12/2015 |

* cited by examiner

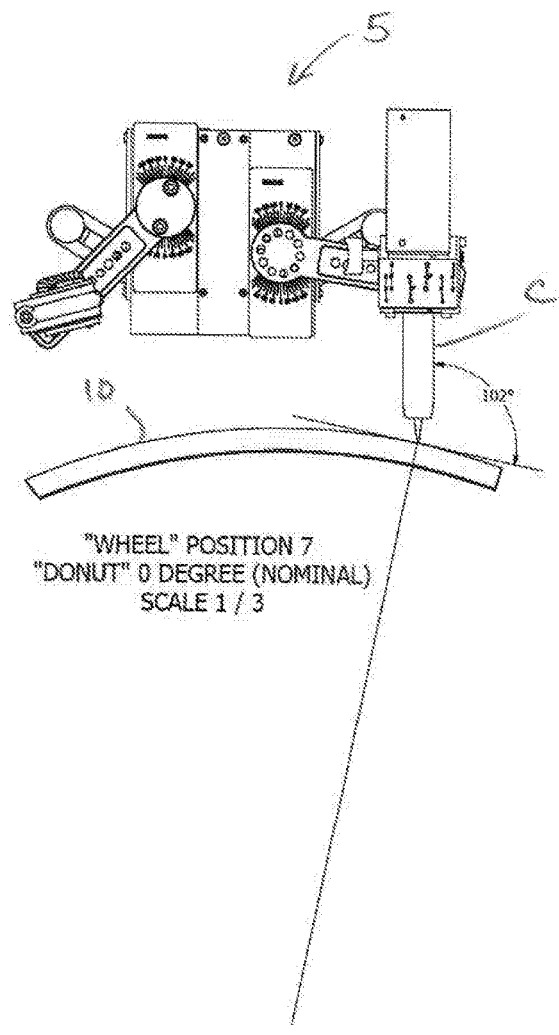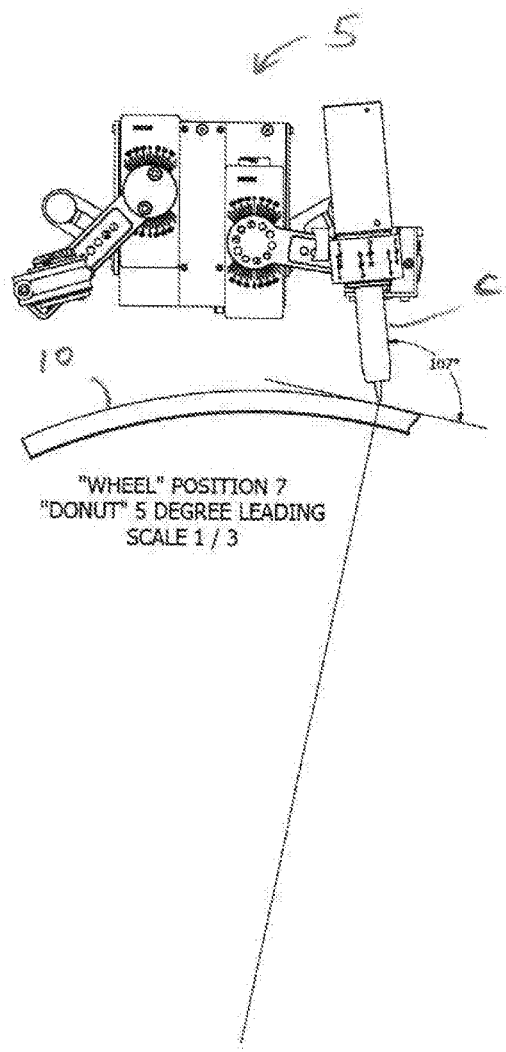
FIG. 10C
FIG. 10D

APPARATUS AND METHOD FOR DISCRETELY POSITIONING A WELDING TORCH

BACKGROUND OF THE INVENTION

The present invention relates to an apparatus and method of welding two pipe segments together. FIGS. 1A, 1B, and 1C are reproduced from U.S. Pat. No. 5,227,601 which shows an orbital welder 5 connected to a first pipe 10 which is to be welded to a second pipe 12 at weld 14. Pipes 10 and 12 are aligned along a longitudinal axis a so that orbital welder 5 rotates about pipe axis a and about pipes 10 and 12. The orbital connection between orbital welder 5 and pipe 10 is via a track 24 which is strapped around pipe 10. A wheeled, grooved guide (not shown) on a lower side of orbital welder 5 traps track 24 thereto and guides orbital welder 5 around track 24 and around pipes 10 and 12.

FIG. 1B shows orbital welder 5 from a side view with torch C able to automatically pivot about an axis parallel to longitudinal axis a and in and out of the page to traverse weld W. FIG. 1C shows a view of orbital welder 5 looking longitudinally down the pipe and showing multiple pivot configurations in solid and shadow. FIG. 1C shows a bracket 56 in which torch C is pivotally secured.

In operation, the degree of freedom represented by the automatic pivotal movement in the alternate configurations shown in FIG. 1C may be just one of the automatic torch movements. For example, orbital welder 5 may also include other degrees of freedom such as back and forth in the pipe longitudinal direction the width of the gap 24. These torch motions are bookended by minimum and maximum operational torch angles in those particular degrees of freedom. Upon set up of the machine, torch C has to be placed in an initial position close to the center of the range between minimum and maximum operational torch angles for that degree of freedom. If torch C is not sufficiently accurately centered, the automatic machine control will swing the torch out of the maximum and minimum angle range for that degree of freedom. Swinging torch C out of range would result in torch angles to small or large to produce an optimum weld.

Prior art orbital welders 5, facilitate that initial central positioning of the torch using continuous/infinite adjustment mechanism. In other words, each degree of freedom may be position initialized to any of infinite positions within the range allowed by the automatic control. So, to initialize the position(s) of a new machine, an operator must make some educated guesses as to the initial positioning (among infinite positions) which will achieve the desired automatic angle range to be determined by the orbital welder in each degree of freedom. Such a requirement makes it difficult for an operator to utilize any past knowledge of desirable/acceptable element positioning to generate future accurate/desirable/acceptable element positioning.

It would be beneficial to develop a torch support system in which torch position degrees of freedom are defined discretely so that initial positional angles of orbital welder 5 can be determined by choosing among a finite amount of initial positions. It would also be beneficial if such discrete positioning allowed an operator to easily disassemble a portion of orbital welder 5 (e.g., to replace a defective torch) and reassemble it quickly back into certain prior known or essentially the same initial angles.

SUMMARY OF THE INVENTION

According to one aspect of the invention a system is provided which includes a torch holder assembly including elements which can be interconnected in multiple discrete configurations in order to support a welding torch in multiple discrete configurations. Adjacent elements of the torch holder assembly are connectable to each other in multiple configurations that ultimately correspond to multiple respective torch angles in a particular torch motion degree of freedom. Adjacent elements may also include quick release connection mechanisms that may provide spring biased and/or tool free release and reconnection. Specifically, the present invention provides for a torch positioner capable of automatically welding two pipe segments together. The pipe segments may be positioned colinearly along a longitudinal axis and abutting each other at ends to define a weld gap between their ends. The torch positioner may include a torch holder assembly and a base assembly and an angle member. The torch holder assembly may include an angle block assembly and a quick angle lock assembly. The angle block assembly may include a receptacle for securely holding the torch and a first plurality of mounts. The quick angle lock assembly may include a shaped connector receptacle or shaped connector projection. The quick angle lock assembly may also include a first mount. The first mount is selectively connectible to each of the first plurality of mounts to secure the angle lock assembly to the quick lock assembly at a first plurality of relative angles corresponding respectively to the first plurality of mounts. The base assembly may include a quick angle lock receptacle for complementarily receiving the shaped connector projection. The base assembly may further include a second mount. The angle member may include a first side which includes a second plurality of mounts. The angle member may further include a second side, having a third plurality of mounts. The second mount may be selectively connectible to each of the second plurality of mounts to secure the base assembly to the angle member at a second plurality of relative angles corresponding respectively to the second plurality of mounts. Furthermore, the third plurality of mounts (e.g., hexagonal surfaces) selectively connectible to a welder arm in a plurality of discrete configurations to secure the torch positioner to the arm at a third plurality of relative angles. The first, second, and third plurality of relative angles being angles measured in the plane of the weld perpendicular to a longitudinal axis of pipe segments to be welded.

BRIEF DESCRIPTION OF THE DRAWINGS

FIGS. 10A, 10B, 10C, and 10D each show a view of a distinct torch configuration of the torch holder assembly looking down the longitudinal axis of the pipe.

DETAILED DESCRIPTION OF THE PREFERRED EMBODIMENTS

Figure 1A:
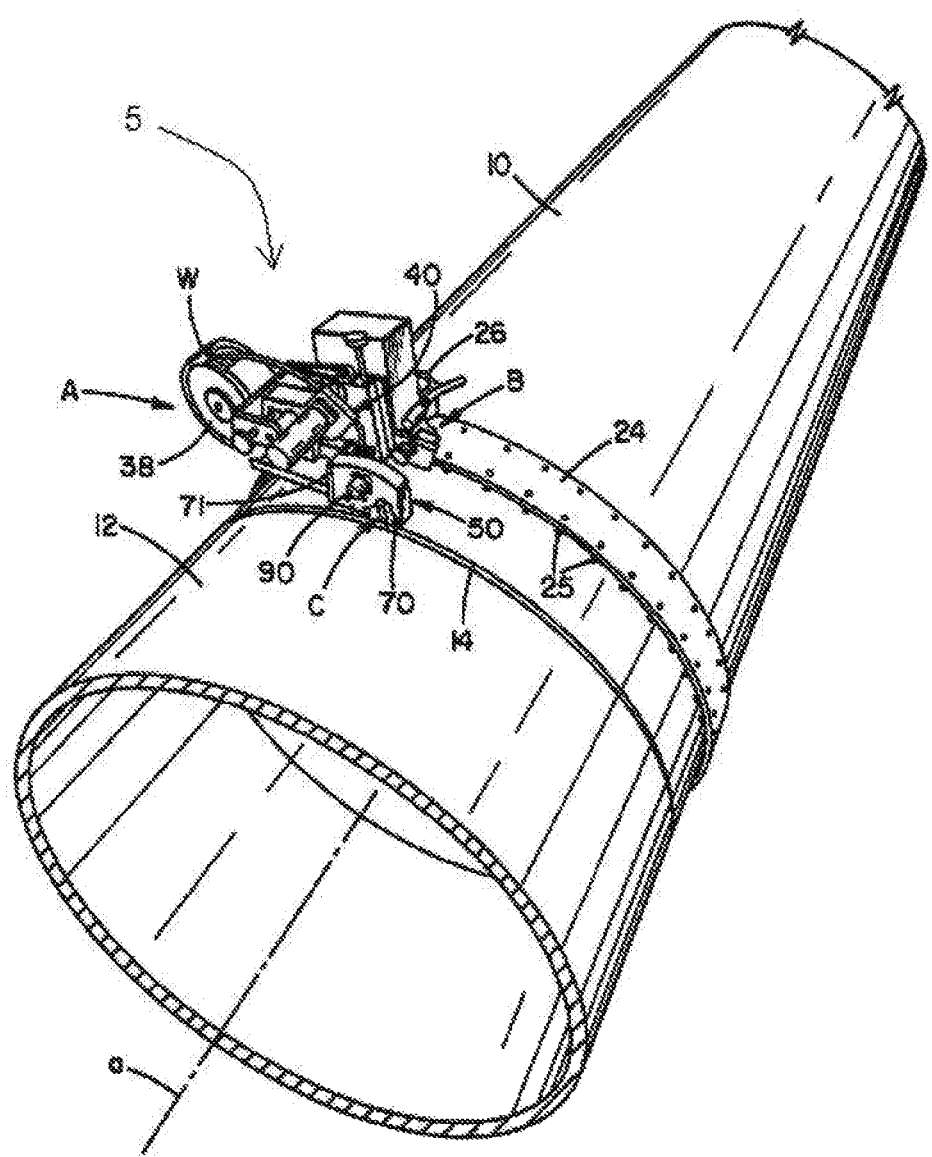
FIG. 1A shows a prior art automatic orbital welder of the present invention mounted to pipe segments to be welded.

Conventional automatic orbital welders 5 as shown in FIG. 1A are widely employed to quickly and effectively weld two (e.g., 10 and 12) segments of a pipeline together. When a first segment 10 is to be welded to a second segment 12, a track 24 may be strapped around first pipe segment 10. A wheeled and/or geared connection and drive mechanism (not shown) on the bottom of welder 5 may be attached to track 24 so as to guide welder 5 in an orbital path around pipe 10. That travel may be motorized and facilitated by gears on the wheeled and/or geared connection and drive mechanism which engage gears on track 24. The rollable attachment between welder 5 and track 24 may be any kind that rollably traps wheels onto welder 5 via track 24.

Figure 1B:
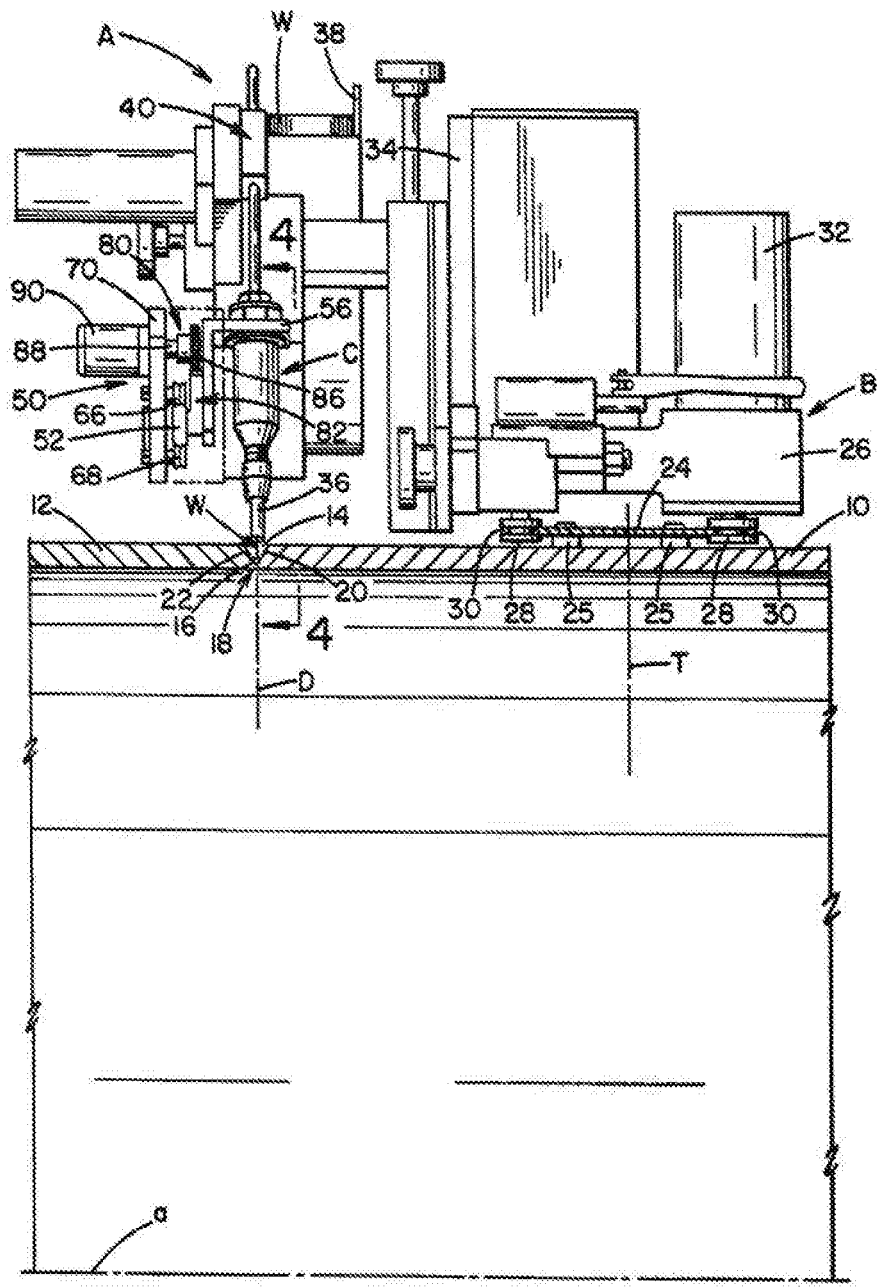
FIG. 1B show a side view of the prior art automatic orbital welder of FIG. 1.
Figure 1C:
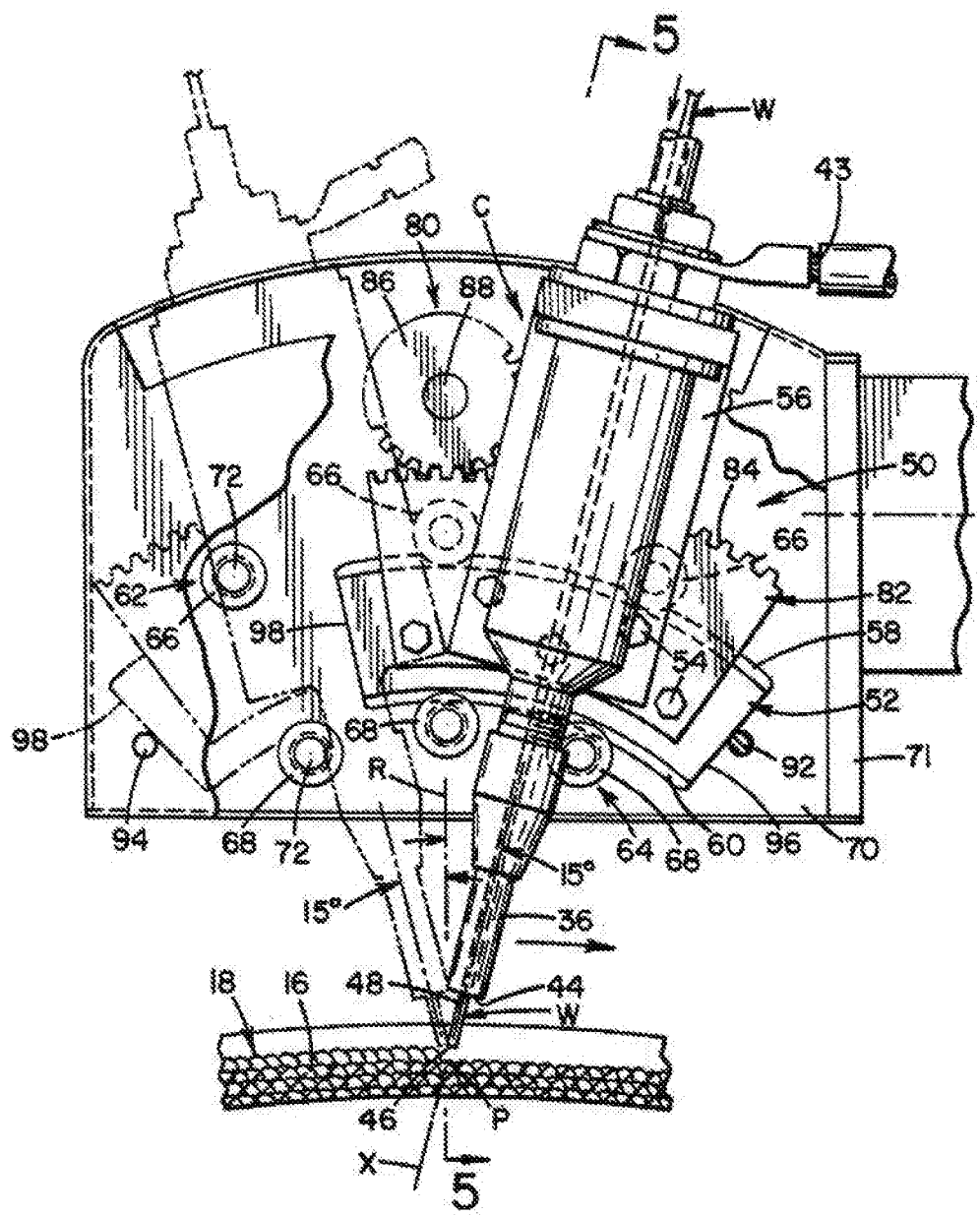
FIG. 1C shows the prior art automatic orbital welder of FIG. 1 looking along a longitudinal axis of the pipe segments.

After welder 5 is connected to track 24, torch C of welder 5 is positioned generally over weld gap 14. Welder 5 can then automatically traverse track 24 to perform an automatic welding process in a 360° rotation around the pipe 10. Additionally, a plurality of welders 5 could be used to perform automatic welding processes in a 180° rotation around the pipe. In addition to automatic movement around pipe 10, welder 5 is able to pivot torch C in multiple degrees of freedom relative to weld gap 14 in order to build a desired weld. For example, welder 5 may provide automatic motorized pivoting of torch C in a plane of the circular weld perpendicular to a longitudinal axis a of pipe segments 10 and 12 as shown in FIG. 1C. Welder 5 may also provide for pivotal or linear movements in other degrees of freedom such as back and forth in the width of weld gap 14 parallel to the longitudinal axis a.

Figure 2:
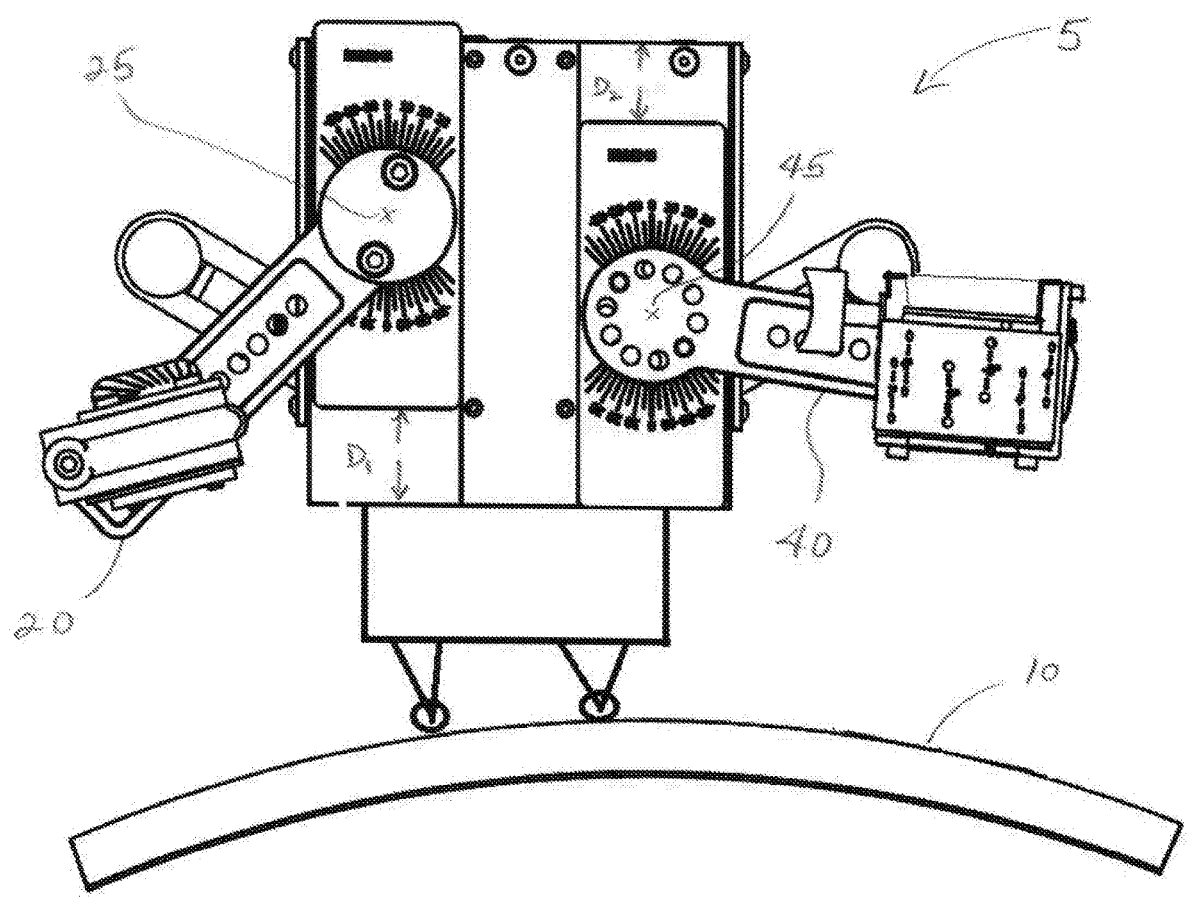
FIG. 2 shows a front view of an automatic orbital welder of the present invention mounted to a pipe segment.
Figure 3:
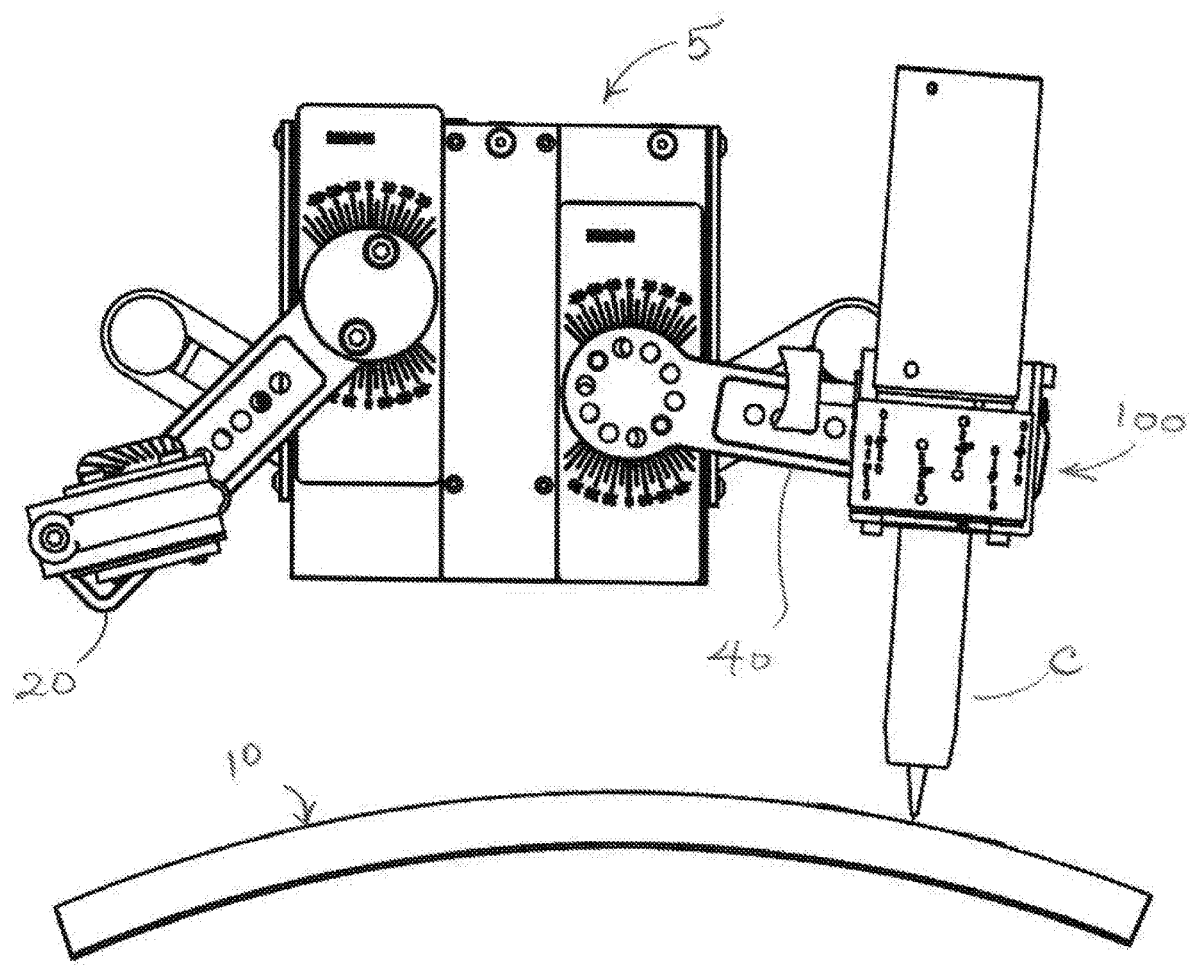
FIG. 3 shows a front view of the welder of FIG. 2 with a torch holder assembly mounted thereto.

FIGS. 2 and 3 show an automatic orbital welder 5 of the present invention. Welder 5 includes arms 20 and 40 that may each rotate respectively about axes 25 and 45 which axes remain parallel to pipe central longitudinal axis a. Furthermore, axes 25 and 45 may move up and down respectively in the D1 and D2 direction which is a generally radial direction with respect to longitudinal axis a. In other words, torch position adjustments along D1 and D2 radially move torch C closer to or farther from to weld gap 14.

Figures 4A, 4B:
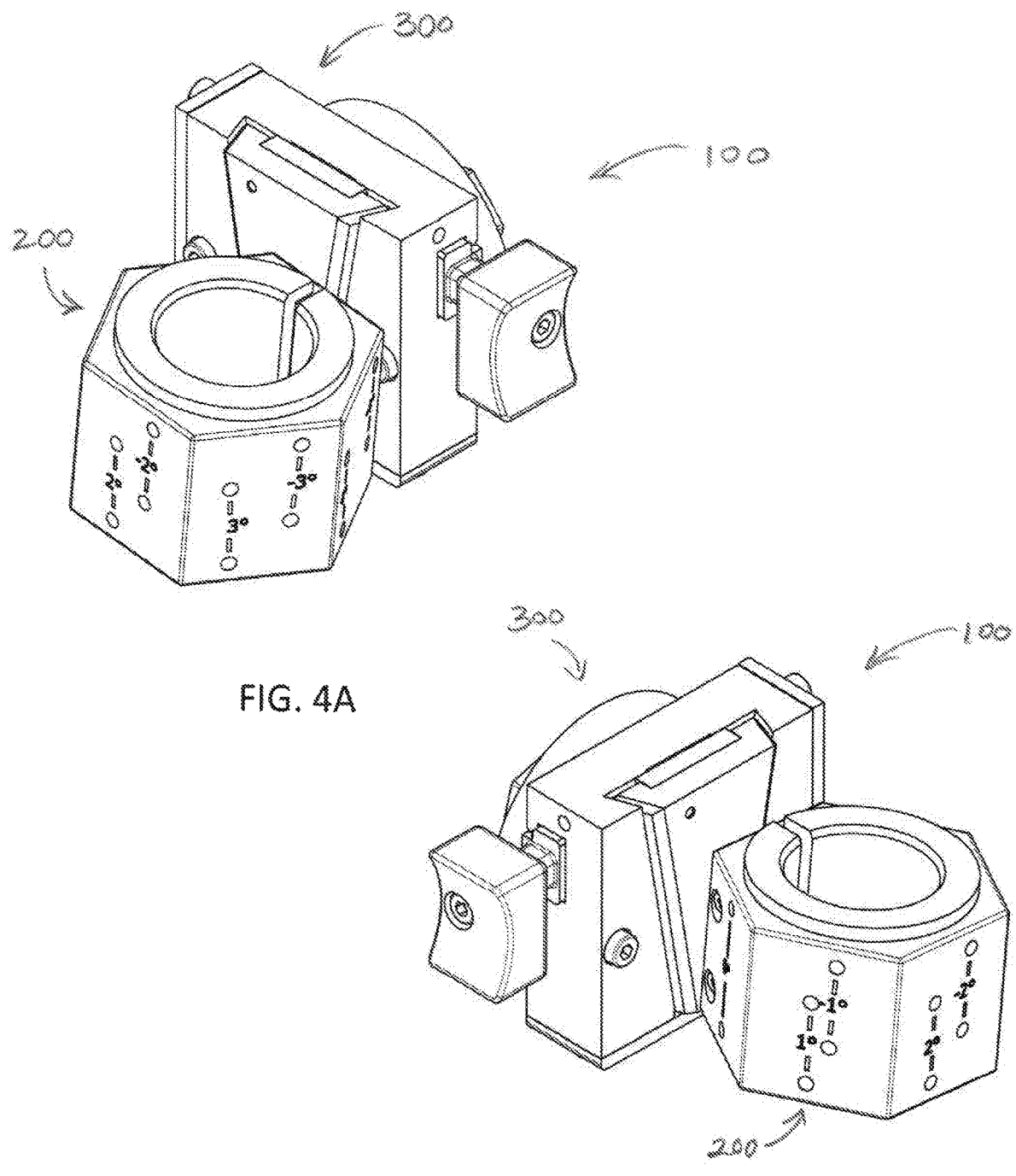
FIGS. 4A and 4B show the torch holder assembly of FIG. 3 assembled in standard and mirrored configurations.
Figure 5:
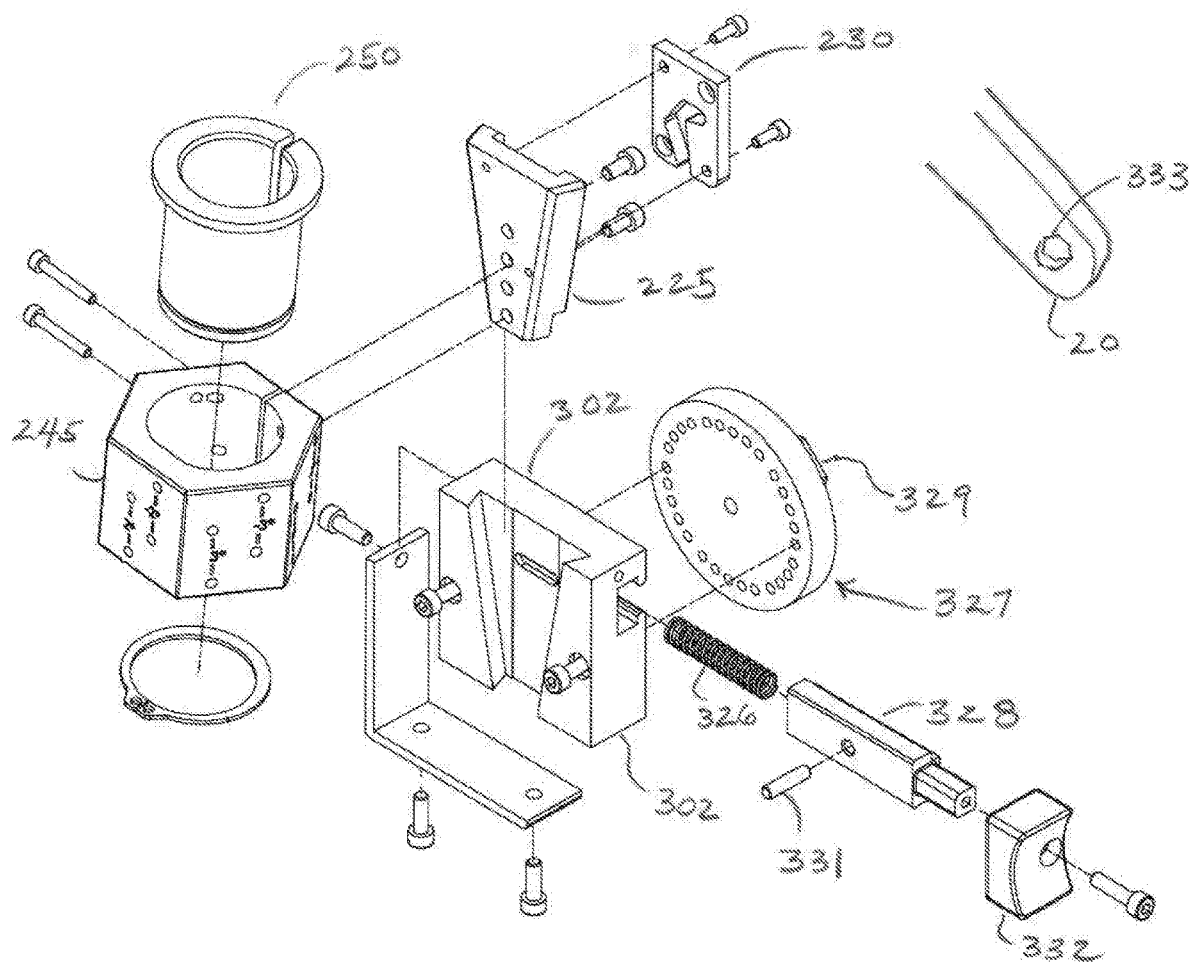
FIG. 5 is an exploded view of the torch holder assembly of FIG. 3.
Figure 6A:
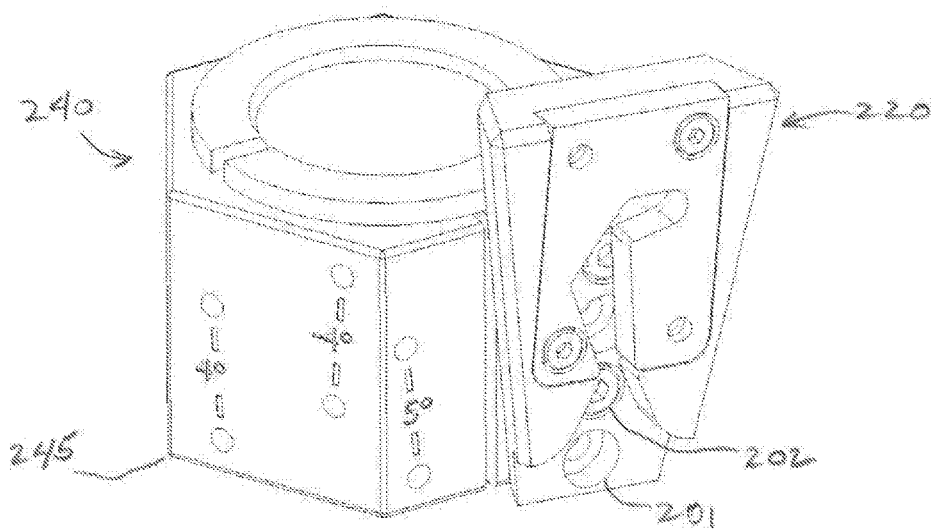
FIG. 6A shows a torch holder of the torch holder assembly of FIG. 3.
Figures 7A, 7B:
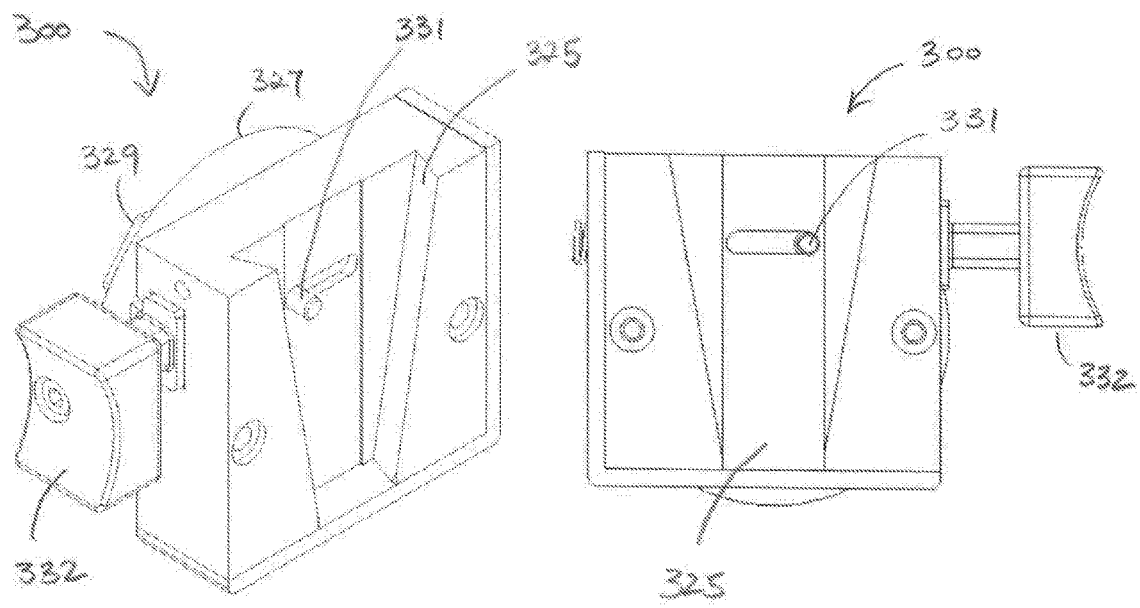
FIGS. 7A and 7B show respective perspective and front views of the base assembly of the torch holder assembly of FIG. 3.
Figures 7C, 7D:
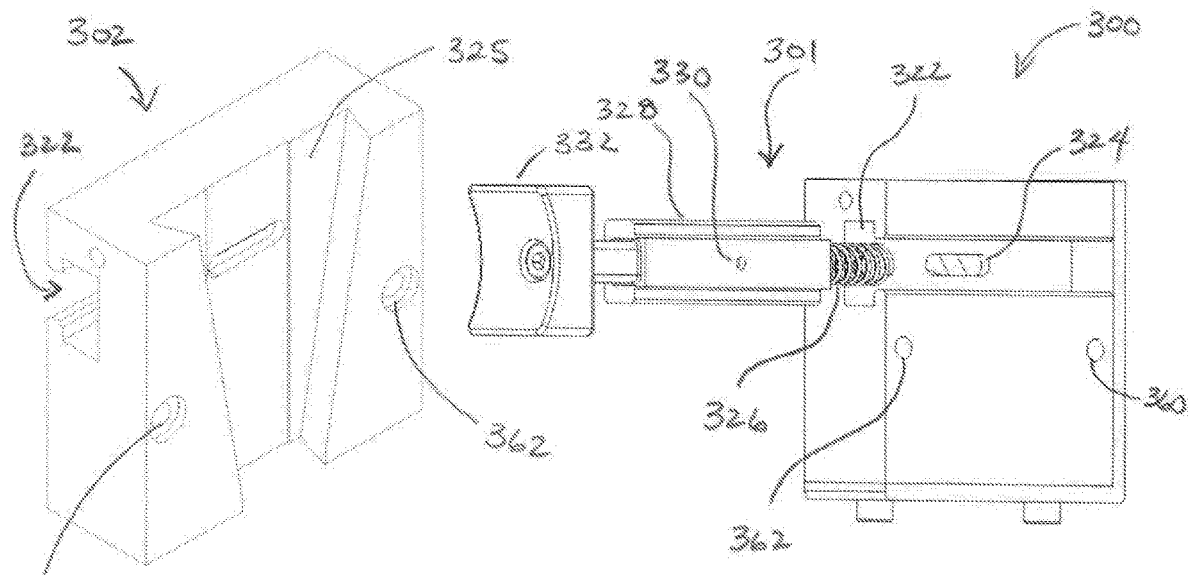
FIG. 7C shows a base body of the base assembly of FIGS. 7A and 7B.
FIG. 7D shows the base assembly of FIGS. 7A and 7B in an unassembled configuration.

In FIG. 3 torch C is shown suspended from and connected to arms 20 and 40 via a torch holder assembly 100. Torch holder assembly 100 is shown in FIGS. 4A and 4B in more detail. Specifically, FIG. 4A shows the torch holder assembly 100 assembled in a primary configuration and FIG. 4B shows assembly 100 (using the same parts from FIG. 5) assembled in a mirrored configuration. FIG. 5 shows an exploded configuration of the torch holder assembly 100. Torch holder assembly 100 includes a torch assembly 200 which is shown in FIG. 6A and a base assembly 300 which is shown in FIGS. 7A and 7B.

Figure 6B:
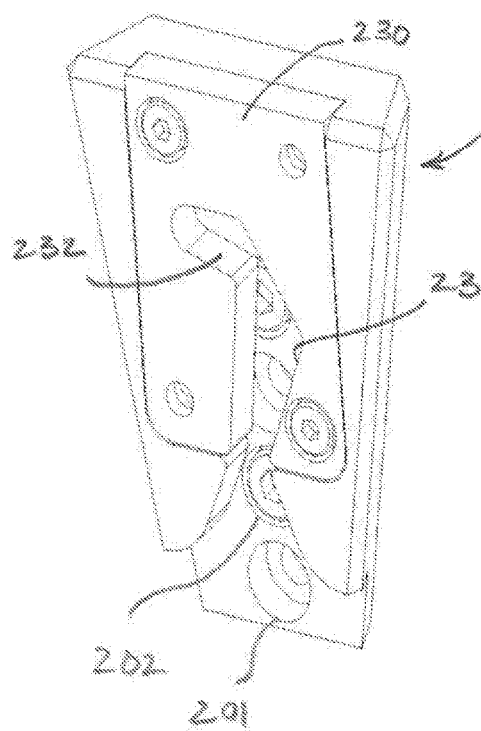
FIG. 6B shows a quick angle lock of the torch holder of FIG. 6A.
Figure 6C:
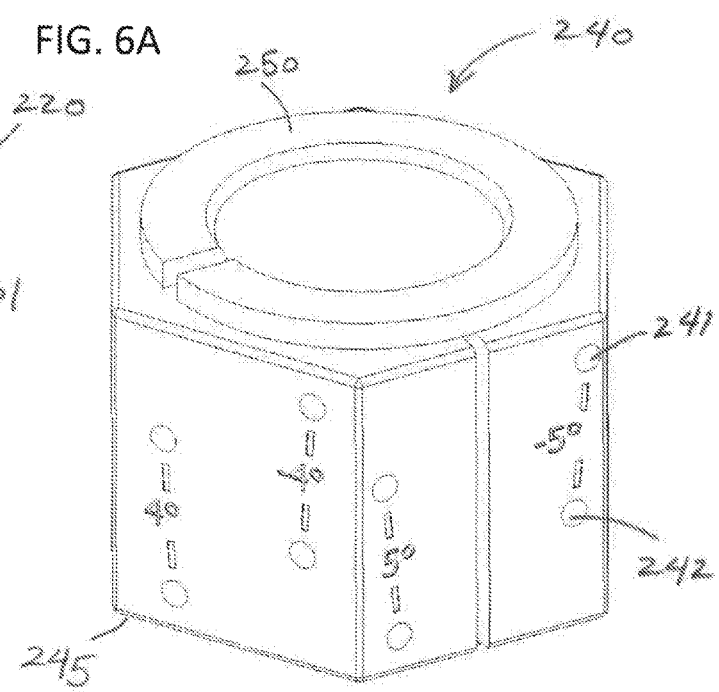
FIG. 6C shows an angle block of the torch holder of FIG. 6A.

Torch assembly 200 includes a quick angle lock assembly 220 which is shown in FIG. 6B and an angle block assembly 240 which is shown in FIG. 6C. When assembled, quick angle lock assembly 220 may include a self-centering mechanism, in the described embodiment shown as a v-shaped connector 225 and a locking groove member 230. Locking groove member 230 includes a locking groove 231. Locking groove 231 is for lockably and positively engaging a pin of base assembly 300, the operation of which will be described in more detail below. Quick angle lock assembly 220 also includes mounts 201, 202 (e.g., openings or threaded openings) or pairs of mounts. The quick angle lock mounts 201, 202 may align with corresponding mounts from angle block assembly 240 as described below.

As mentioned above, torch holder assembly 100 also includes an angle block assembly 240. Angle block assembly 240 includes a hexagonal or multi-faceted mount 245 and an insulator 250. Insulator 250 is a current insulator that isolates or prevents current fed to torch C from the welding power source (not shown) from passing through to other parts of the torch holder assembly 100 of the automatic orbital welder 5. Hexagonal or multi-faceted mount 245 includes a plurality of positioning mounting pairs 241, 242 (see FIGS. 6A and 6C) on various of its flat surfaces. The mounting pairs (e.g., 241, 242) may be openings (e.g., threaded) to which quick angle lock assembly 220 may be connected or anchored. Connection of a particular quick angle lock mounting pair 201, 202 to a particular or corresponding angle block mounting pair 241, 242 secures quick angle lock assembly 220 relative to angle block assembly 240 at a known or predetermined angle (e.g., 5°, −5°, 0°, etc.). When multi-faceted mount 245 is connected at or to a particular pair of the positioning mounting pairs, such connection represents a unique discrete positioning of insulator 250 and thus torch C relative to a respective one of torch arms 20 or 40.

Figure 4C:
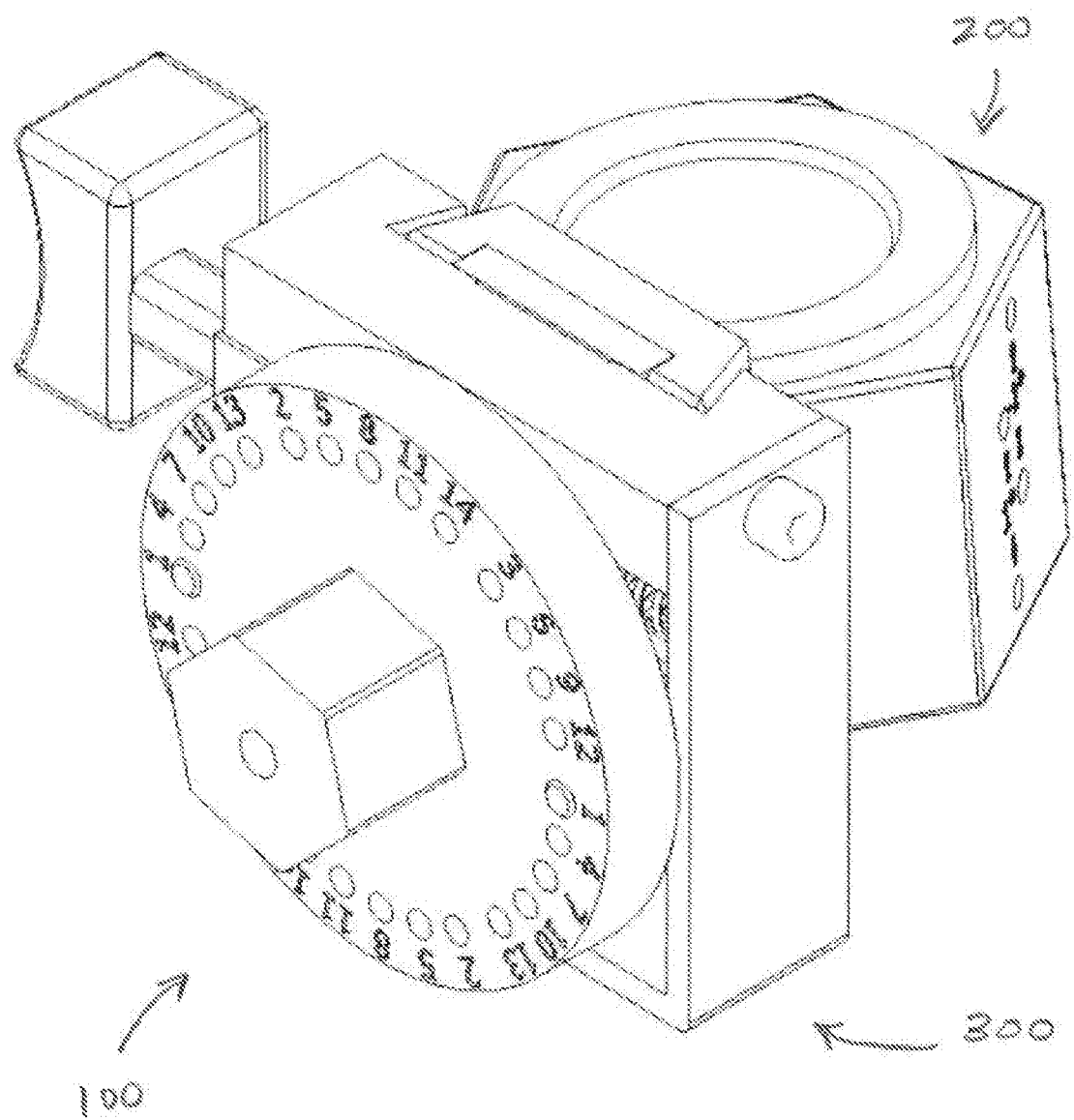
FIG. 4C shows an upper rear perspective view of the torch holder of FIGS. 4A and 4B.

When orbital welder 5 is fully assembled, base assembly 300 is connected between torch holder assembly 200 and arms 20 and 40. To be connected to arms 20, 40 base assembly 200 includes an angle wheel 327 and a shaped (e.g., hexagonal) extension 329 projecting from a center of the angle wheel 327 and away from torch C (shown best in FIG. 4C). Arms 20, 40 may include a shaped receptacle 333 for receiving shaped extension 329 and securing angle wheel 227 rotationally relative to arm 20 or 40. If shaped extension 329 is a hexagon extension, shaped extension 329 could be held by arms 20, 40 in six (6) distinct and discrete rotational configurations relative to arm 20, 40.

Figure 9:
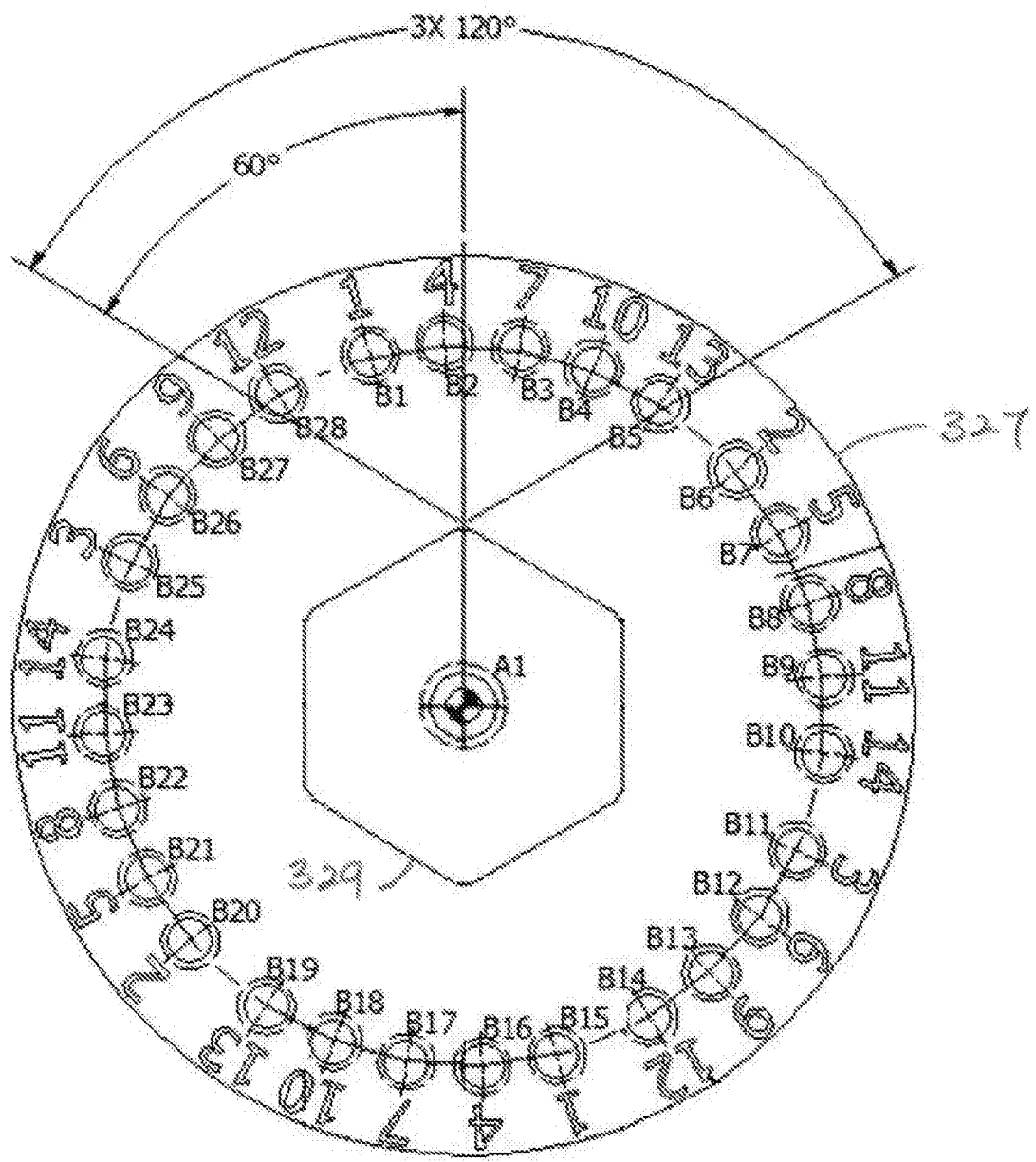
FIG. 9 shows the angle wheel of the base assembly of FIG. 7A

FIG. 7A shows the torch side of base assembly 300. Base assembly 300 includes a base block 302 on a side opposite the torch side of angle wheel 327 from shaped extension 329. Angle wheel 327 is connected to base block 302 via fasteners (e.g., a pair of threaded fasteners). Base block 302 may include mounts 360, 362 (e.g., a pair of openings). Openings 360, 362 may be threaded for receiving threaded fasteners. As shown in FIG. 9, angle wheel 227 includes a plurality of pairs of openings. The openings may be labelled with indicia and may be disposed radially opposite one another. Base block 302 may be selectively connected to angle wheel 327 (e.g., via threaded fastener) by paring openings 360, 362 of base block 302 with a particular similarly labelled pair (e.g., 1 and 1 or 13 and 13) of openings on angle wheel 327 as shown in the indicia of FIG. 9. Each such connection between base block 302 and angle wheel 237 represents a distinct relative positioning/configuration between the two.

As mentioned above, on the torch side of base assembly 300 from shaped extension 329, base assembly 300 is connected to torch holder assembly 200. As shown in FIGS. 7A, 7B, 7C, and 7D, base assembly 300 is configured to be selectably connectable to quick angle lock assembly 220. Base assembly 300 includes a button slot 322, a quick angle locked receptacle 325, and a pin slot 324. Base assembly 300 also includes a button assembly 301 which is slidably and biasingly received in button slot 322. Button assembly 301 includes a spring 326 or resilient member, a button body 328, a locking pin 331 and a button 332. Button body 328 includes a pin connector 330 for facilitating connection of locking pin 331 to button body 328.

To assemble locking assembly 301, spring 326 is inserted into button slot 322 until it engages an end wall of button slot 322 (i.e., the L Bracket 399). Spring 326 is followed by button body 328 and engages button body 328 in button slot 322 until spring 326 is trapped between a slot end wall and button body 328. Pin connector 330 of button body 328 may now be aligned in pin slot 324 by sliding button body 328 longitudinally along button slot 322 which is parallel with pin slot 324. When pin connector 330 is aligned with and accessible through pin slot 324, pin 331 can be connected to pin connector 330 so that pin 331 extends transversely through pin slot 324 and projects into quick angle lock receptacle 325. Pin 331 is then able to limit the longitudinal travel of button body 328 in button slot 322. Button 332 is then connected to an end of button body 328 opposite spring 326. A user can now depress button 332 via depression of spring 326 in order to move pin 331 longitudinally with respect to pin slot 324. Such pin movement also means that pin 331 is able to move sideways within quick angle lock receptacle 325, but limited by a width of pin slot 324.

Figure 8A:
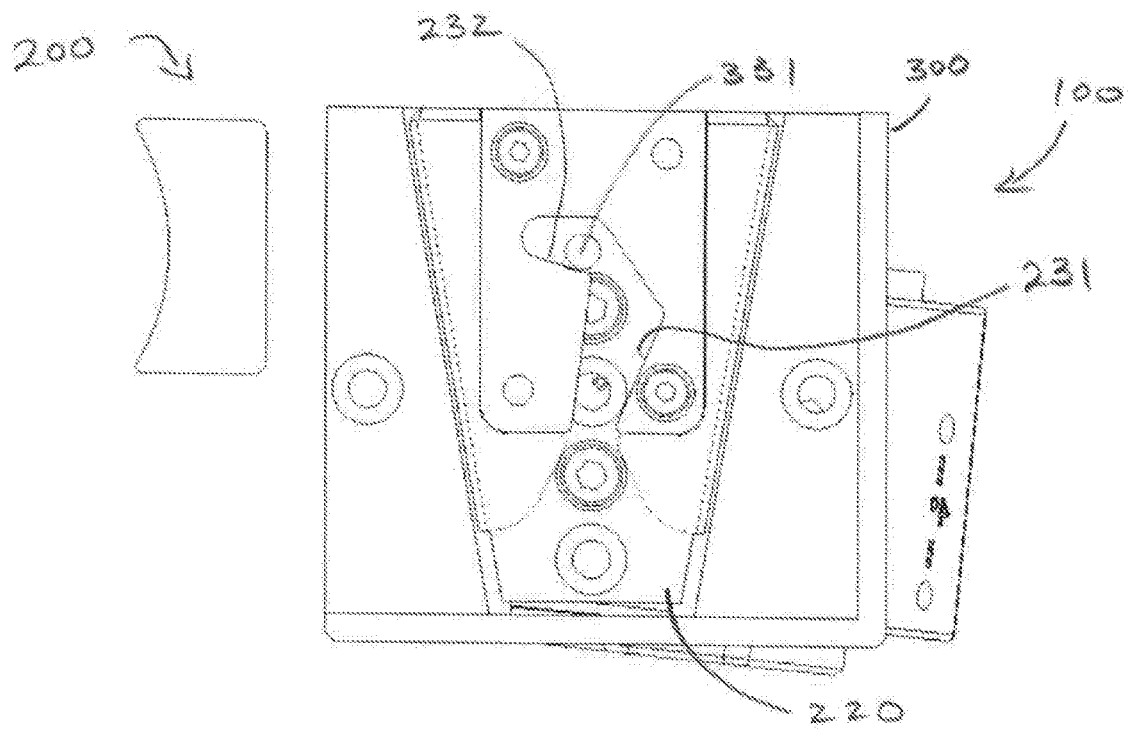
FIG. 8A shows cut away view of the torch holder assembly with the angle block removed to show the position of the pin in torch lock position.
Figure 8B:
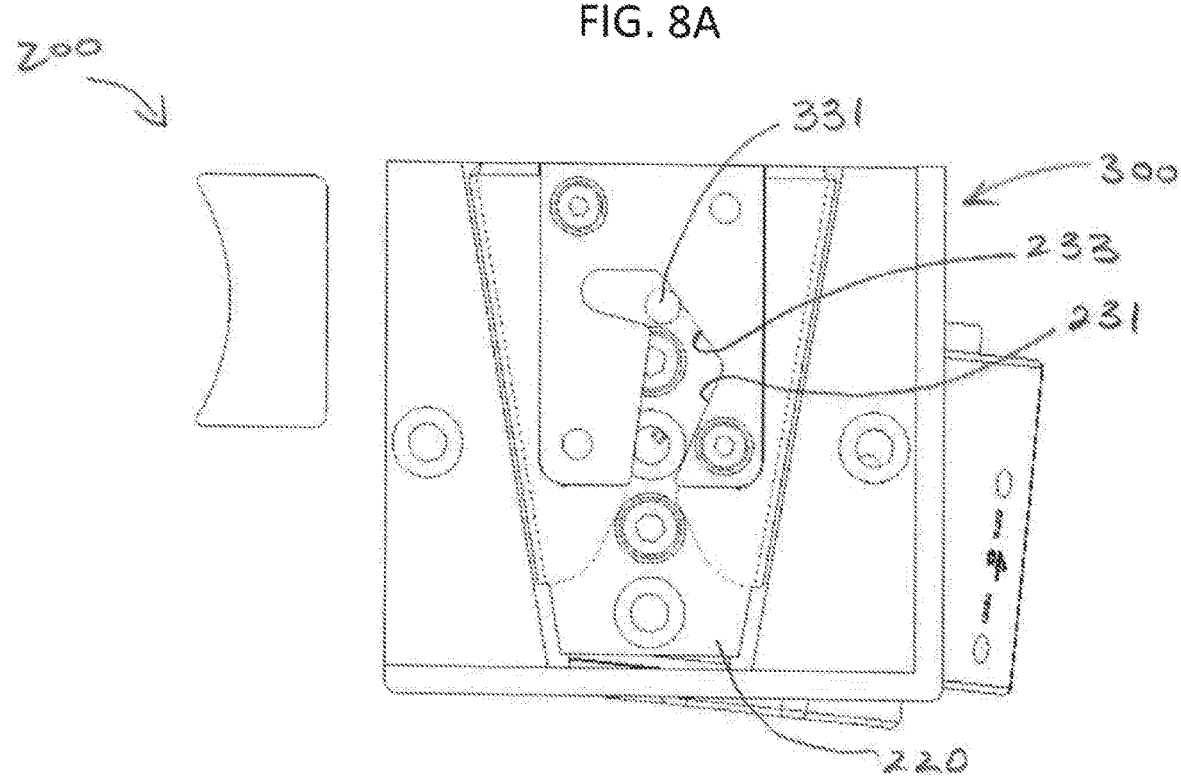
FIG. 8B shows cut away view of the torch holder assembly with the angle block removed to show the position of the pin in torch unlock position.

The locking operation between torch holder assembly 200 and base assembly 300 will now be described. As shown in FIGS. 8A and 8B, a thinner end of quick angle lock assembly 220 is inserted in a thicker opening of the quick angle lock slot 325. When torch holder assembly 200 is inserted into quick angle lock slot or quick angle lock receptacle 325, locking groove 231 faces pin 331 and in fact pin 331 which extends into quick angle lock receptacle 235 also extends into locking groove 231 as shown in FIGS. 8A and 8B. Specifically, pin 331 first enters locking groove 231 via locking groove opening 234. In a rest position of button assembly 301, pin 331 aligns with slot opening 234 so that as quick angle lock assembly 220 is lowered into dove receptacle 325, pin 331 passes up and through locking groove 231. As pin 331 passes through locking groove 231 edges of locking groove 231 may biasingly force pin 331 left or right along locking groove 231 (in the direction of pin slot 324) so that pin 331 travels through or along locking groove 231.

Because of the shape/path of locking groove 231, pin 331 is eventually biased (by spring 326) away from ejection surface 233 and toward and against locking surface 232. In this locked configuration, because pin 331 is between locking surface 232 and the larger open end of dovetail receptacle 325, pin 331 blocks any attempted removal of torch holder assembly 200 from base assembly 300. Furthermore, because pin 331 is biased against locking surface 232, pin 331 essentially locks quick angle lock assembly 220 snuggly into dovetail receptacle 325.

To remove torch holder assembly 200 from quick angle lock receptacle 325 of base assembly 300, button 332 is pressed which (against the biasing force of spring 326) moves pin 331 toward and against ejection surface 233. Ejection surface 233 is angled at an incline such that forcing pin 331 against ejection surface 233 in a direction along the length of pin slot 324 forces/urges quick angle lock assembly 220 upward and out of quick angle lock receptacle 325.

The available discrete configuration adjustments for initial positioning a torch relative to a pipeline weld will now be discussed. First, the position of angle wheel 327 relative to arms 20, 40 may be selectively fixed by securing shaped extension 329 of angle wheel 327 within shaped receptacle 333 of arm 20. This first adjustment may be described herein as the base adjustment. Second, as shown in FIG. 9, angle wheel 327 may be discretely connected to base block 302 in multiple distinct relative positions/configurations via paired connections between openings 360, 362 and the marked paired openings on angle wheel 237. This second adjustment may be described herein as the course adjustment. Third, quick angle lock assembly 220 may be discretely connected to angle block 245 in multiple distinct relative positions/configurations via a pair of openings 201, 202 on quick angle lock assembly 220 being paired with corresponding uniquely positioned openings or mounts 241, 242 on angle block 245. This choice of connections may be referred to herein as the fine adjustment.

In operation (e.g., if a torch needs to be quickly changed on a pipeline construction site), an operator may quickly remove torch holder assembly 200 from base assembly 300 by pressing button 332 as discussed above. The undesired torch C may be exchanged for the desired torch C in the insulator 250. After replacement or while the welder 5 and the other head angle is being set up/changed, the operator may position the fine adjustment to correspond to 0° as shown on angle lock assembly 245. The operator may then quickly (by the process described above) reconnect torch holder assembly 200 to base assembly 300 using button 332. The operator may then initially adjust the course adjustment between angle wheel 327 and base block 302. That initial course positioning may be eyeballed based on operator experience. From that initial 0° position connections among the remaining mount positions on angle block assembly 245 would allow the operator to adjust the fine adjustment angle as shown in FIG. 1C (or into the page in FIG. 1) by 1° increments between 5° and −5° (i.e., 10 additional respective mounting pair positions) if necessary. A base adjustment between arms 20, 40 and shaped extension 329 may also be made if necessary. For example, from experience an operator may learn that a particular base adjustment positioning allows an operator to most quickly achieve an acceptable initial torch angle for a particular size (e.g., diameter) pipe. Furthermore, by experience particular combinations of base, course, and fine adjustments may be observed to be likely starting points for most quickly achieving an acceptable initial torch position.

Figure 10A:
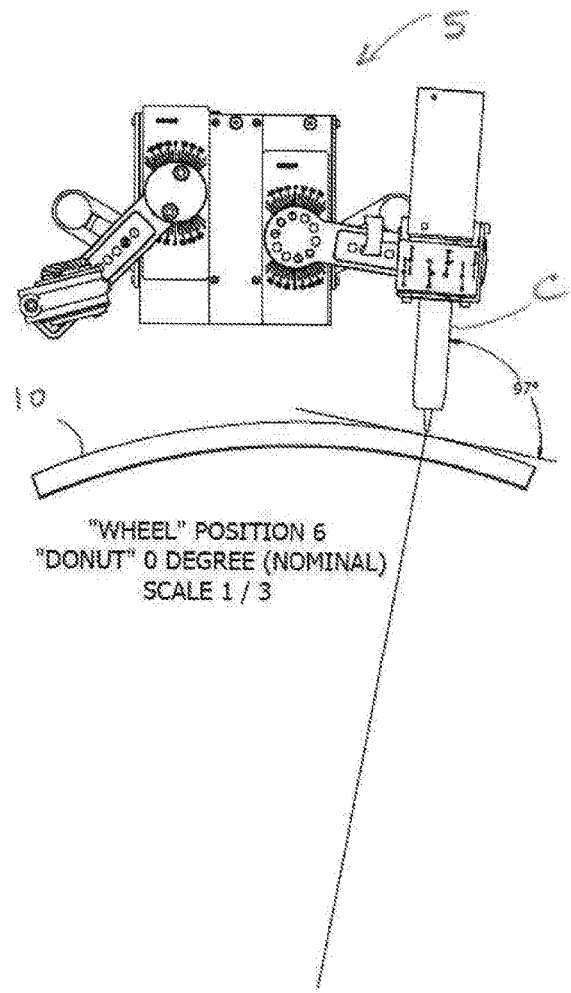
Figure 10B:
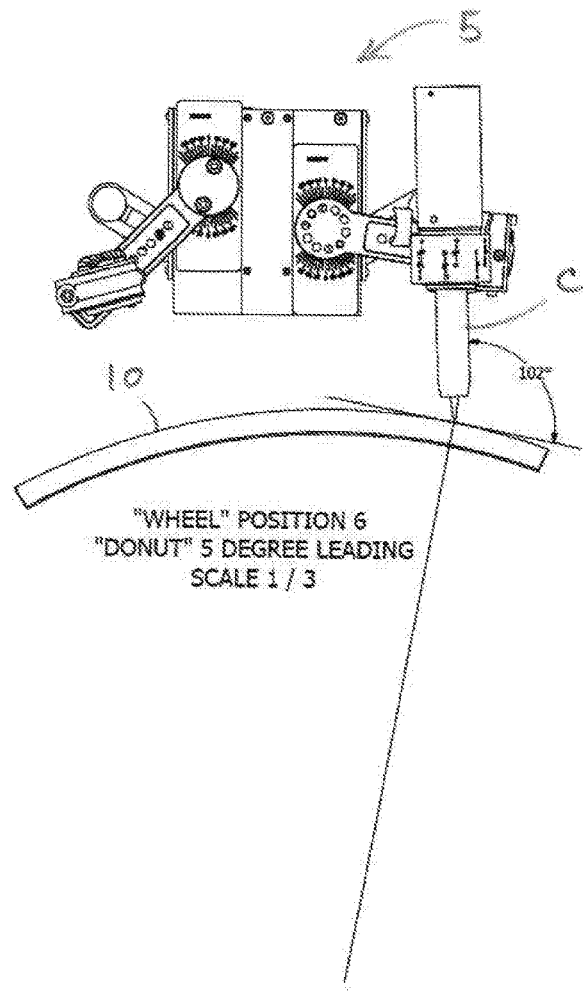

FIGS. 9A, 9B, 9C, and 9D show torch positions and angles for various choices or combinations of choices for fine course and base angles. Specifically, a combination of a course positioning at a position 6 on angle wheel 327 and a fine positioning at an angle block 245 position angle 0° will result in the torch angle of 97° as shown in FIG. 10A. The resultant angle (e.g., 97°) is the outside angle between a longitudinal axis of torch C and a tangent line to the pipe at the weld point. A combination of a course positioning at a position 6 on angle wheel 327 and a fine positioning at an angle block 245 position angle 5° will result in the torch angle of 102° as shown in FIG. 10B. In other words, with or from a resultant angle of 97°, at an angle block 245 position of 0°, an operator may easily adjust the angle of torch C in 1° increments between 102° for an angle block position of 5° to 92° for an angle block position of −5°. Similarly, a combination of a course positioning at a position 7 on angle wheel 327 and a fine positioning at an angle block 245 position angle 0° will result in the torch angle of 102° as shown in FIG. 10C. A combination of a course positioning at a position 7 on angle wheel 327 and a fine positioning at an angle block 245 position angle 5° will result in the torch angle of 107° as shown in FIG. 10D. Again, from the 7 position of angel wheel 327 and with or from a resultant angle of 107°, at an angle block 245 position of 0°, an operator may easily and discretely adjust the angle of torch C in 1° increments between 107° for an angle block position of 5° to 97° for an angle block position of −5°.

The embodiments of the present disclosure described above are intended to be examples only. The present disclosure may be embodied in other specific forms. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

What is claimed is:

1. A torch positioner for automatically welding two pipe segments together, the pipe segments positioned colinearly along a longitudinal axis and abutting at ends to define a weld gap at the ends, the torch positioner comprising:
   a torch holder assembly,
      the torch holder including an angle block assembly,
         the angle block assembly including a receptacle for securely holding the torch, the angle block assembly also including a first plurality of mounts;
      the torch holder also including a quick angle lock assembly,
         the quick angle lock assembly including a shaped connector projection, the quick angle lock assembly also including a first mount; wherein
         the first mount is selectively connectible to each of the first plurality of mounts to secure the angle lock assembly to the quick lock assembly at a first plurality of relative angles corresponding respectively to the first plurality of mounts
   a base assembly,
      the base assembly including a quick angle lock receptacle for complementarily receiving the shaped connector projection, the base assembly further including a second mount;
   an angle member;
      the angle member including a first side, the first side including a second plurality of mounts;
      the angle member further including a second side, the second side
         including a third plurality of mounts; wherein
            the second mount is selectively connectible to each of the second plurality of mounts to secure the base assembly to the angle member at a second plurality of relative angles corresponding respectively to the second plurality of mounts; and
         wherein
            the third plurality of mounts is selectively connectible to a welder arm in a plurality of discrete configurations to secure the torch positioner to the arm at a third plurality of relative angles; wherein the first, second, and third plurality of relative angles are angles measured in the plane of the weld perpendicular to a longitudinal axis of pipe segments to be welded.

2. The torch positioner of claim 1, wherein the first plurality of relative angles is finer than the second plurality of relative angles.

3. The torch positioner of claim 1, wherein the second plurality of relative angles is finer than the third plurality of relative angles.

4. The torch positioner of claim 1, wherein the shaped connector projection is tapered.

5. The torch positioner of claim 1, wherein the mounting projection is a shaped projection.

6. The torch positioner of claim 1, wherein the quick angle lock assembly is a dovetail assembly.

7. The torch positioner of claim 1, wherein the second plurality of mounts is a plurality of pairs of mount openings.

8. The torch positioner of claim 7, wherein the plurality of pairs of mount openings are arranged generally in a circle.

9. The torch positioner of claim 1, wherein the third plurality mounts are surfaces on a shaped projection.

10. A welder for automatically positioning a torch, the welder comprising: a main unit having at least one torch supporting arm extending therefrom, a control system for automatically positioning the least one torch supporting arm, the torch positioning arm supporting a torch positioner of claim 1 and a torch supported by the torch positioner.

11. A torch positioner for automatically welding two pipe segments together, the pipe segments positioned colinearly along a longitudinal axis and abutting at ends to define a weld gap at the ends, the torch positioner comprising:
   a torch holder assembly,
      the torch holder including an angle block assembly,
         the angle block assembly including a receptacle for securely holding the torch, the angle block assembly also including a first plurality of mounts;
      the torch holder also including a quick angle lock assembly,
         the quick angle lock assembly including a shaped connector projection, the quick angle lock assembly also including a first mount; wherein
         the first mount is selectively connectible to each of the first plurality of mounts to secure the angle lock assembly to the quick lock assembly at a first plurality of relative angles corresponding respectively to the first plurality of mounts
   a base assembly,
      the base assembly including a quick angle lock receptacle for complementarily receiving the shaped connector projection, the base assembly further including a second mount;

an angle member;
the angle member including a first side connectible to the base assembly and a second side connectible to a welder arm in a plurality of discrete configurations to secure the torch positioner to the welder arm at a plurality of relative angles different from the first plurality of relative angles.

12. The torch positioner of claim 11, wherein the first plurality of relative angles is finer than the plurality of angles different from the first plurality of angles.

13. The torch positioner of claim 11, wherein the shaped connector projection is tapered.

14. The torch positioner of claim 1, wherein the quick angle lock assembly is a dovetail assembly.

15. The torch positioner of claim 1, wherein the first plurality of mounts is a plurality of pairs of mount openings.

\* \* \* \* \*